US012673386B2

(12) United States Patent
Nakayama

(10) Patent No.: US 12,673,386 B2
(45) Date of Patent: Jul. 7, 2026

(54) METHOD OF MANUFACTURING SECONDARY BATTERY

(71) Applicant: Prime Planet Energy & Solutions, Inc., Tokyo (JP)

(72) Inventor: Shota Nakayama, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 860 days.

(21) Appl. No.: 17/970,571

(22) Filed: Oct. 21, 2022

(65) Prior Publication Data

US 2023/0127234 A1 Apr. 27, 2023

(30) Foreign Application Priority Data

Oct. 22, 2021 (JP) ................................. 2021-173470

(51) Int. Cl.
*B23K 26/24* (2014.01)
*H01M 50/169* (2021.01)

(52) U.S. Cl.
CPC ........... *B23K 26/24* (2013.01); *H01M 50/169* (2021.01)

(58) Field of Classification Search
CPC ...... B23K 26/24; B23K 26/21; B23K 26/206; H01M 50/169
USPC ............................ 219/121.64, 121.6, 121.63
See application file for complete search history.

(56) References Cited

U.S. PATENT DOCUMENTS

| | | | | |
|---|---|---|---|---|
| 5,879,416 | A | * | 3/1999 | Nakamura ............. B23K 26/28 |
| | | | | 29/623.2 |
| 6,045,944 | A | * | 4/2000 | Okada ................. H01M 50/636 |
| | | | | 429/185 |
| 2007/0128514 | A1 | * | 6/2007 | Yoshida .............. H01M 50/184 |
| | | | | 429/185 |
| 2009/0087737 | A1 | * | 4/2009 | Yamauchi ........... H01M 50/566 |
| | | | | 429/185 |
| 2010/0247992 | A1 | | 9/2010 | Miyata et al. |
| 2011/0240613 | A1 | * | 10/2011 | Hosokawa ............. B23K 26/24 |
| | | | | 219/121.64 |

FOREIGN PATENT DOCUMENTS

| | | | | |
|---|---|---|---|---|
| CN | 1241301 | A | | 1/2000 |
| CN | 1241302 | A | | 1/2000 |
| CN | 101229607 | A | * | 7/2008 |
| CN | 101952997 | A | | 1/2011 |
| EP | 0942476 | A1 | | 9/1999 |

(Continued)

*Primary Examiner* — Steven W Crabb
*Assistant Examiner* — Alba T Rosario-Aponte
(74) *Attorney, Agent, or Firm* — HAUPTMAN HAM, LLP

(57) ABSTRACT

A method of manufacturing a secondary battery according to the disclosure includes an attaching step of attaching a sealing plate to an open end of a case main body including a closed bottom, and a welding step of laser-welding the case main body and the sealing plate together by scanning a laser beam along a peripheral edge portion of the sealing plate. In the welding step, the laser beam applied to the peripheral edge portion of the sealing plate and to an edge of the open end of the case main body may be a pulsed laser beam including a rectangular wave and having a pulse width of from 400 μm to 800 μm and a frequency of from 1.2 kHz to 1.4 kHz, and the laser beam is scanned such that adjacent laser pulses of the pulsed laser beam have an overlap rate of 84.4% to 86.6%.

6 Claims, 4 Drawing Sheets

(56) References Cited

FOREIGN PATENT DOCUMENTS

| EP | 0969534  | A1 |   | 1/2000  |
|----|----------|----|---|---------|
| JP | H11144692 | A  | * | 5/1999  |
| JP | H11250871 | A  | * | 9/1999  |
| JP | 2011212711 | A |   | 10/2011 |

* cited by examiner

METHOD OF MANUFACTURING SECONDARY BATTERY

CROSS REFERENCE TO RELATED APPLICATIONS

The present application claims priority from Japanese Patent Application No. 2021-173470 filed on Oct. 22, 2021, which is incorporated by reference herein in its entirety.

BACKGROUND

The present invention relates to a method of manufacturing a secondary battery.

JP 2011-212711 A discloses a method of manufacturing a sealed battery, in which a fitting part of an outer can made of an aluminum-based metal and a sealing plate made of an aluminum-based metal disposed an opening of the outer can are weld and sealed together by applying a laser beam from a continuous wave laser welding apparatus. In the just-mentioned method of manufacturing a sealed battery, the welding start region is scanned with the laser output power being pulse-modulated and thereafter scanned with the laser output power being made constant. It is stated that such a method of manufacturing a sealed battery allows the welding start region and a welding end region to be welded stably when welding and sealing together the outer can made of an aluminum-based metal and the sealing plate made of an aluminum-based metal with a continuous wave (CW) laser.

SUMMARY

It is desirable to further improve welding quality in welding together an open end of a case main body and a peripheral edge portion of a sealing plate.

A method of manufacturing a secondary battery according to the present disclosure includes: an attaching step of attaching a sealing plate to an open end of a closed-bottom case main body, the open end disposed opposite a bottom surface, and a welding step of laser-welding the case main body and the sealing plate together by scanning a laser beam along a peripheral edge portion of the sealing plate. In the welding step, the laser beam applied to the peripheral edge portion of the sealing plate and an edge of the open end of the case main body may be a pulsed laser beam including a rectangular wave and having a pulse width of from 400 μm to 800 μm and a frequency of from 1.2 kHz to 1.4 kHz, and the laser beam is scanned such that adjacent laser pulses of the pulsed laser beam have an overlap rate of 84.4% to 86.6%. The just-described method of manufacturing a secondary battery makes it possible to control the weld penetration depth of the welded part to an appropriate depth, so the welding quality improves.

It is also possible that, in the welding step, a peak output power of the laser beam may be partially changed while scanning the laser beam along the peripheral edge portion of the sealing plate.

The peripheral edge portion of the sealing plate before being welded may include a grooved portion including a groove and an ungrooved portion including no groove, the grooved portion and the ungrooved portion being formed inwardly of the peripheral edge portion, for example. When this is the case, the peak output power of the laser beam when welding the ungrooved portion may be set higher than the peak output power of the laser beam when welding the grooved portion in the welding step.

It is also possible that the sealing plate may be a substantially rectangular-shaped plate member including a pair of longer side portions opposing each other and a pair of shorter side portions opposing each other. The open end of the case main body has a substantially rectangular shape corresponding to the sealing plate, and in the welding step, the peak output power of the laser beam when welding the longer side portions is set higher than the peak output power of the laser beam when welding the shorter side portions.

In addition, the sealing plate may include curved portions disposed between the longer side portions and the shorter side portions. In this case, in the welding step, a peak output power of the laser beam when welding the curved portions is set lower than a peak output power of the laser beam when welding the shorter side portions.

It is also possible that the peak output power of the laser beam may be gradually increased at respective boundaries between the curved portions and the longer side portions and the shorter side portions in the peripheral edge portion of the sealing plate. It is also possible that a portion at which welding is started and a portion at which welding is ended overlap in the peripheral edge portion of the sealing plate.

DETAILED DESCRIPTION

Figure 1:
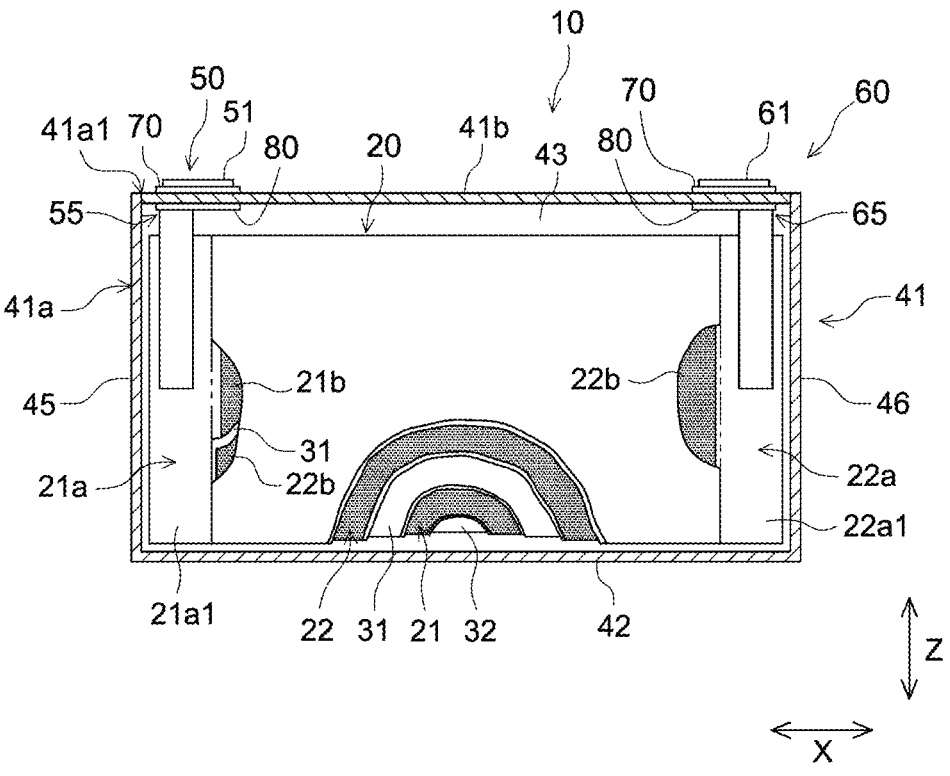
FIG. 1 is a partial cross-sectional view of a lithium-ion secondary battery 10.

Embodiments of the present disclosure will be described hereinbelow. It should be noted, however, that the embodiments illustrated herein are, of course, not intended to limit the disclosure. The drawings are depicted schematically and do not necessarily accurately depict actual objects. Unless specifically stated otherwise, the recitation of numerical ranges herein, such as "A to B", is meant to include any values between the upper limits and the lower limits, inclusive, that is, "greater than or equal to A to less than or equal to B". In the drawings referred to hereinbelow, the parts and components that exhibit the same effects are denoted by the same reference symbols, and repetitive description thereof may be simplified or omitted. In the drawings referred to in the present description, reference character X represents the axis along a longer side, reference character Y represents the axis along a shorter side, and reference character Z represents the axis along the height.

In the present description, the term "secondary battery" refers any electricity storage device in general in which charge-discharge reactions are caused by migration of charge carriers through an electrolyte between a pair of electrodes (positive electrode and negative electrode). The term "secondary battery" is also intended to encompass what is called storage batteries, such as lithium-ion secondary batteries, nickel-metal hydride batteries, and nickel-cadmium batteries, as well as capacitors, such as electric double-layer capacitors. Herein, a lithium-ion secondary battery, which is one type of the secondary batteries mentioned above, is taken as an example to describe the method of manufacturing a secondary battery according to the present disclosure. Unless specifically stated otherwise, the present disclosure may be applied not just to the lithium-ion secondary battery but also to other types of secondary batteries.

Lithium-Ion Secondary Battery 10

Figure 2:
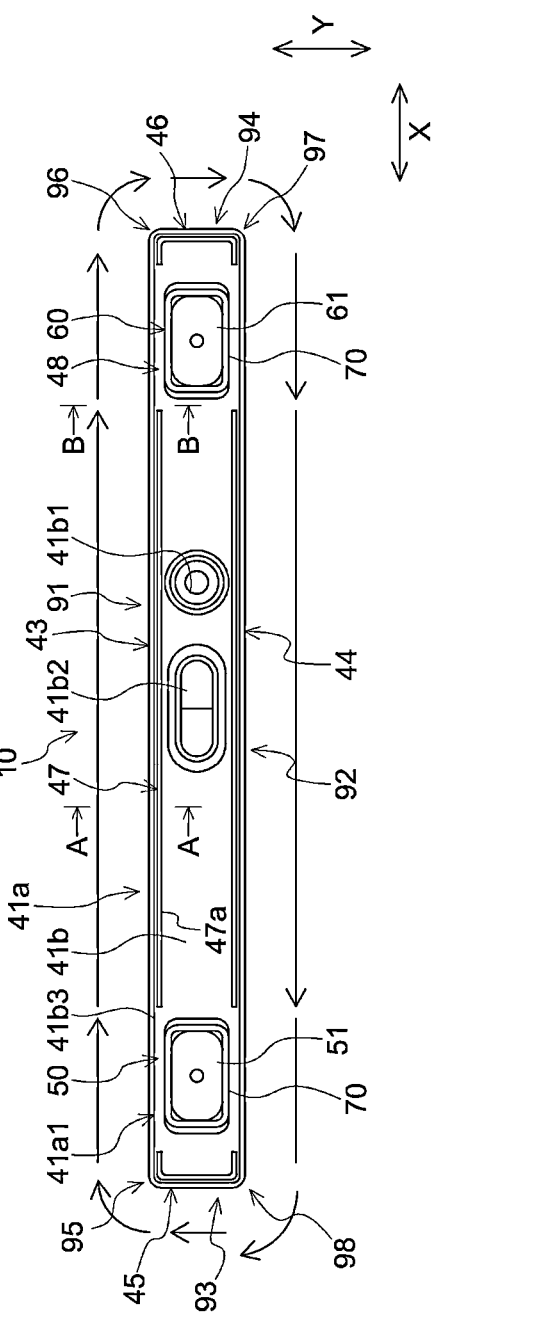
FIG. 2 is a plan view illustrating an upper surface of the lithium-ion secondary battery 10 to which a sealing plate 41b is attached.

FIG. 1 is a partial cross-sectional view of a lithium-ion secondary battery 10. FIG. 2 is a plan view illustrating an upper surface of the lithium-ion secondary battery 10 to which a sealing plate 41*b* is attached. FIG. 1 depicts the battery interior that is exposed along one wide side surface of a battery case 41 in substantially a rectangular parallelepiped shape. The lithium-ion secondary battery 10 shown in FIG. 1 is what is called a sealed battery in which the battery case 41 accommodating an electrode assembly 20 is sealed.

As illustrated in FIG. 1, the lithium-ion secondary battery 10 includes an electrode assembly 20 and a battery case 41. The battery case 41 includes a case main body 41*a* that includes an open end 41*a*1, and a sealing plate 41*b* that closes the open end 41*a*1 of the case main body 41*a*. The case main body 41*a* encloses the electrode assembly 20. Internal terminals 55, 65 and external terminals 51, 61 are attached to the sealing plate 41*b*, with a gasket 70 and an insulator 80 interposed between them. In this embodiment, the internal terminal 55 is connected to a positive electrode current collector foil 21*a* of the electrode assembly 20. The external terminal 51 is connected to the internal terminal 55, constituting a positive electrode terminal 50 outside the battery case 41. The internal terminal 65 is connected to a negative electrode current collector foil 22*a* of the electrode assembly 20. The external terminal 61 is connected to the internal terminal 65, constituting a negative electrode terminal 60 outside the battery case 41.

Electrode Assembly 20

The electrode assembly 20 is covered with an insulating film (not shown) and is enclosed in the battery case 41. The electrode assembly 20 includes a positive electrode sheet 21 serving as a positive electrode element, a negative electrode sheet 22 serving as a negative electrode element, and separator sheets 31 and 32 serving as separators. Each of the positive electrode sheet 21, the first separator sheet 31, the negative electrode sheet 22, and the second separator sheet 32 is a long strip-shaped member.

The positive electrode sheet 21 includes a positive electrode current collector foil 21*a* (for example, an aluminum foil) having a predetermined width and a predetermined thickness, a positive electrode active material layer 21*b* containing a positive electrode active material, and an uncoated portion 21*a*1 defined along one lateral edge of the positive electrode current collector foil 21*a* with a constant width. The positive electrode active material layer 21*b* is formed on both faces of the positive electrode current collector foil 21*a*, except for the uncoated portion 21*a*1. In a lithium-ion secondary battery, for example, the positive electrode active material is a material that is capable of releasing lithium ions during charge and absorbing lithium ions during discharge, such as lithium-transition metal composite materials. Generally, other than the lithium-transition metal composite materials, various materials have been proposed for use as the positive electrode active material, and the positive electrode active material is not limited to any particular material.

The negative electrode sheet 22 includes a negative electrode current collector foil 22*a* (copper foil herein) having a predetermined width and a predetermined thickness, a negative electrode active material layer 22*b* containing a negative electrode active material, and an uncoated portion 22*a*1 defined along one lateral edge of the negative electrode current collector foil 22*a* with a constant width. The negative electrode active material layer 22*b* is formed on both faces of the negative electrode current collector foil 22*a*, except for the uncoated portion 22*a*1. In a lithium-ion secondary battery, for example, the negative electrode active material is a material that is capable of absorbing lithium ions during charge and releasing the absorbed lithium ions during discharge, such as graphite. Generally, other than graphite, various materials have been proposed for use as the negative electrode active material, and the negative electrode active material is not limited to any particular material.

Each of the separator sheets 31 and 32 may be formed of, for example, an electrolyte permeable porous resin sheet with required heat resistance. Various proposals have been made about the separator sheets 31 and 32, and there is no particular restriction on the separator sheets 31 and 32.

Here, the negative electrode active material layer 22*b* is formed, for example, so as to be wider than the positive electrode active material layer 21*b*. The width of the separator sheets 31 and 32 is wider than the width of the negative electrode active material layer 22*b*. The uncoated portion 21*a*1 of the positive electrode current collector foil 21*a* and the uncoated portion 22*a*1 of the negative electrode current collector foil 22*a* are arranged at laterally opposite ends. The positive electrode sheet 21, the first separator sheet 31, the negative electrode sheet 22, and the second separator sheet 32 are aligned longitudinally, stacked one on another, and wound together. The negative electrode active material layer 22*b* covers the positive electrode active material layer 21*b* with the separator sheets 31 and 32 interposed therebetween. The negative electrode active material layer 22*b* is covered with the separator sheets 31 and 32. The uncoated portion 21*a*1 of the positive electrode current collector foil 21*a* protrudes from one of the lateral edges of the separator sheets 31 and 32. The uncoated portion 22*a*1 of the negative electrode current collector foil 22*a* protrudes from the other one of the lateral edges of the separator sheets 31 and 32.

As illustrated in FIG. 1, the electrode assembly 20 is formed in a flattened shape along one plane containing the winding axis so that it can be enclosed in a case main body 41*a* of the battery case 41. Along the winding axis of the electrode assembly 20, the uncoated portion 21*a*1 of the positive electrode current collector foil 21*a* is disposed at one end, and the uncoated portion 22*a*1 of the negative electrode current collector foil 22*a* is disposed at the opposite end.

Battery Case 41

The battery case 41 encloses the electrode assembly 20. The battery case 41 includes a case main body 41*a* and a sealing plate 41*b*. The case main body 41*a* is a closed-bottom member having an open end 41*a*1 disposed opposite its bottom surface. In this embodiment, the case main body 41*a* is in a substantially rectangular parallelepiped shape one side surface of which is open. The sealing plate 41*b* is a plate-shaped member attached to the open end 41*a*1 of the case main body 41*a*. In this embodiment, the case main body 41*a* and the sealing plate 41*b* are formed of aluminum or an aluminum alloy composed mainly of aluminum, from the viewpoints of reducing weight and providing sufficient rigidity. Although the embodiment shown in FIG. 1 illustrates a wound type electrode assembly 20 as an example, the structure of the electrode assembly 20 is not limited to such an embodiment. For example, it is possible that the structure of the electrode assembly 20 may be a stacked structure in which positive electrode sheets and negative electrode sheets are alternately stacked on each other with separators interposed therebetween. It is also possible that a plurality of electrode assemblies 20 may be housed in the battery case 41.

The battery case 41 may also enclose an electrolyte solution, which is not shown, along with the electrode assembly 20. The electrolyte solution may be a non-aqueous electrolyte solution in which a supporting salt is dissolved in a non-aqueous solvent. Examples of the non-aqueous solvent include carbonate-based solvents, such as ethylene carbonate, dimethyl carbonate, and ethyl methyl carbonate. Examples of the supporting salt include fluorine-containing lithium salts, such as $LiPF_6$.

Case Main Body 41a

The case main body 41a has a substantially rectangular parallelepiped shape one side surface of which is open. The case main body 41a includes a substantially rectangular bottom surface portion 42, a pair of wider side surface portions 43 and 44 (see FIG. 2), and a pair of narrower side surface portions 45 and 46. The pair of wider side surface portions 43 and 44 extend upward from respective longer sides of the bottom surface portion 42. The pair of narrower side surface portions 45 and 46 extend upward from respective shorter sides of the bottom surface portion 42. An open end 41a1, which is surrounded by the pair of wider side surface portions 43 and 44 and the pair of narrower side surface portions 45 and 46, is formed in one end face of the case main body 41a.

Sealing Plate 41b

The sealing plate 41b closes the open end 41a1 of the case main body 41a. In this embodiment, the sealing plate 41b is in a rectangular shape when viewed in plan, as illustrated in FIG. 2. In this embodiment, the sealing plate 41b is provided with a filling port 41b1 and a safety vent 41b2. After the sealing plate 41b is attached to the open end 41a1 of the case main body 41a and an electrolyte solution is filled into the case main body 41a, the filling port 41b1 is closed by a sealing member attached thereto. Note that FIG. 2 shows a state in which the sealing plate 41b has been attached and welded to the open end 41a1 of the case main body 41a. In FIG. 2, the sealing member is not attached to the sealing plate 41b. The safety vent 41b2 is a thinned portion that raptures when the internal pressure of the battery case 41 becomes higher than a predetermined pressure.

A positive electrode terminal 50 and a negative electrode terminal 60 are attached to the sealing plate 41b. The positive electrode terminal 50 includes an external terminal 51 and an internal terminal 55. The negative electrode terminal 60 includes an external terminal 61 and an internal terminal 65. Each of the internal terminals 55 and 65 is fitted to the inside of the sealing plate 41b with an insulator 80 interposed. Each of the external terminals 51 and 61 is fitted to the outside of sealing plate 41b with a gasket 70 interposed. Each of the internal terminals 55 and 65 extends inward of the case main body 41a. The uncoated portion 21a1 of the positive electrode current collector foil 21a and the uncoated portion 22a1 of the negative electrode current collector foil 22a of the electrode assembly 20 are attached to the respective internal terminals 55 and 65, which are respectively attached to opposite longitudinal side-edge portions of the sealing plate 41b.

The internal terminals 55 and 65 are made of a metal. The internal terminal 55 of the positive electrode may be made of, for example, aluminum or an aluminum alloy, from the viewpoint of improving the joining strength with the positive electrode current collector foil 21a. The internal terminal 65 of the negative electrode may be made of, for example, copper or a copper alloy, from the viewpoints of improving the joining strength with the negative electrode current collector foil 22a and providing desired resistance such as resistance to electrolyte solution and oxidation resistance.

The external terminals 51 and 61 are made of a metal. The metal usable as the external terminals 51 and 61 may be selected as appropriate depending on, for example, the type of the external component connected thereto, such as bus bar. The external terminals 51 and 61 may be made of, for example, aluminum, an aluminum alloy, copper, a copper alloy, or the like. The external terminals 51 and 61 may be constructed of, for example, a plurality of types of metals joined together by a dissimilar metal joint. Although not shown in the drawings, the sealing plate 41b is formed with mounting holes. An insulator 80 is attached to each of the mounting holes inside the sealing plate 41b, and a gasket 70 is attached to each of the mounting holes outside the sealing plate 41b. Either one of the terminals of the internal terminals 55, 65 and the external terminals 51, 61 is provided with a shaft portion, which is inserted through each of the mounting holes via the gasket 70 and the insulator 80. The internal terminals 55, 65 and the external terminals 51, 61 are joined by the respective shaft portions inserted through the mounting holes.

The gasket 70 and the insulator 80 may be made of a material that is excellent in chemical resistance and weather resistance. In this embodiment, the gasket 70 is made of tetrafluoroethylene-perfluoroalkyl vinyl ether copolymer (PFA). It should be noted that the material that may be used for the gasket 70 is not limited to PFA. The gasket 70 may be made of, for example, polypropylene (PP), polyethylene (PE), polyphenylene sulfide (PPS), or the like. The insulator 80 is made of polyphenylene sulfide (PPS). It should be noted that the material that may be used for the insulator 80 is not limited to PPS.

An example of the electrode assembly 20 illustrated herein is what is called a wound electrode assembly, in which the positive electrode sheet 21, the first separator sheet 31, the negative electrode sheet 22, and the second separator sheet 32 are aligned longitudinally, stacked one on another, and wound together. The electrode assembly 20 is not limited to such a wound electrode assembly. It is also possible that a plurality of electrode assemblies 20 may be housed in the battery case 41. Various kinds of structures may be employed for the internal terminals 55, 65, the external terminals 51, 61, the gasket 70, and the insulator 80. For example, appropriate structures may be employed for the internal terminals 55, 65, the external terminals 51, 61, the gasket 70, and the insulator 80, according to the structure of the electrode assembly 20 enclosed in the battery case 41. In addition, one of the positive electrode terminal 50 and the negative electrode terminal 60 may be provided with a mechanism that interrupts electric current as the internal pressure builds up due to the gas generated inside at the event of overcharge [i.e., current interrupt device (CID)].

In manufacturing the lithium-ion secondary battery 10, with the gasket 70 and the insulator 80 being attached to the sealing plate 41b, the positive electrode terminal 50 and the negative electrode terminal 60 are attached to the sealing plate 41b. Next, the electrode assembly 20 is attached to the positive electrode terminal 50 and the negative electrode terminal 60. Subsequently, the sealing plate 41b is fitted to the open end 41a1 (see FIG. 1) of the case main body 41a, which is surrounded by the longer sides of the pair of wider side surface portions 43 and 44 (see FIG. 2) and the shorter sides of the pair of narrower side surface portions 45 and 46. Then, as illustrated in FIG. 2, the peripheral edge portion 41*b*3 of the sealing plate 41*b* is joined to the edge of the open end 41*a*1 of the case main body 41*a*. The joining may be achieved by, for example, continuous welding without providing gaps. Such welding may be carried out by, for example, laser welding.

Such a sealed battery tends to have a smaller dead space inside the secondary battery in order to achieve higher energy density. When the dead space inside the secondary battery is smaller, the internal pressure of the secondary battery builds up when, for example, gas is formed inside the secondary battery. For this reason, it is desirable that the laser welded portion of the case main body and the sealing plate have higher pressure resistance.

An embodiment of the method of manufacturing a secondary battery according to the present disclosure includes an attaching step of attaching the sealing plate 41*b* to the open end 41*a*1 of the case main body 41*a*, and a welding step of laser-welding the case main body 41*a* and the sealing plate 41*b* together by scanning a laser beam along the peripheral edge portion 41*b*3 of the sealing plate 41*b*.

In the welding step, the laser beam applied to the peripheral edge portion 41*b*3 of the sealing plate 41*b* and the edge of the open end 41*a*1 of the case main body 41*a* is a pulsed mode laser beam composed of a rectangular wave and having a pulse width of from 400 μm to 800 μm and a frequency of from 1.2 kHz to 1.4 kHz. The laser beam is scanned so that adjacent laser pulses of the pulsed laser beam overlap at an overlap rate of from 84.4% to 86.6%.

Figure 3:
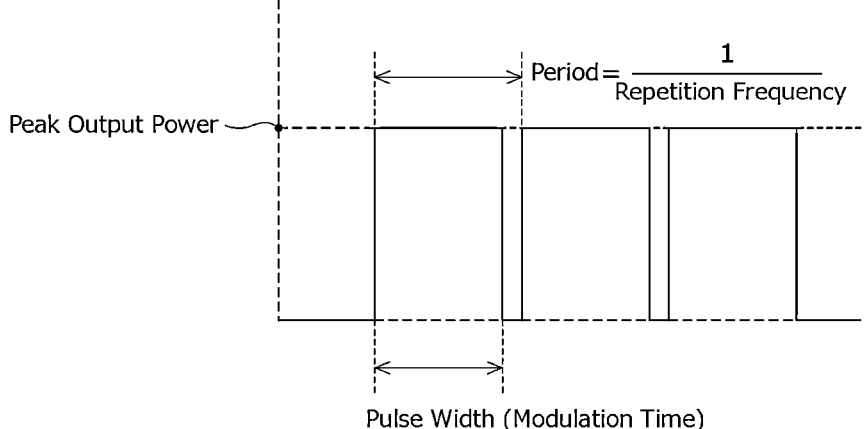
FIG. 3 is a schematic view schematically illustrating a waveform of a pulsed laser beam.

FIG. 3 is a schematic view schematically illustrating a waveform of a pulsed laser beam. Although the waveform of the laser beam is depicted to be a rectangular wave in the figure, it is possible that, for example, the rise of the rectangular wave may have a slope.

The pulse width is the distance at which the laser beam scans a target object during a time in which the laser output power is greater than or equal to a certain power.

The frequency is the reciprocal of the period of the pulse, and the unit used herein is Hertz (Hz).

The overlap rate is the rate of the area in which adjacent laser-melted marks overlap on a target object to be irradiated with the laser when the target object is scanned by the laser operated in a pulsed mode.

In such a welding step, the laser beam is oscillated in a pulsed mode. The laser beam operated in a pulsed mode results in a higher energy per each one pulse than that operated in a so-called continuous wave (CW) mode, in which the peak output power of the applied laser beam is set to be constant. Furthermore, in this embodiment, the frequency of the pulse is fast. For this reason, the adjacent laser beams that are emitted in a pulsed mode overlap at a high rate. This means that, before the weld pool formed by a previously applied laser beam solidifies completely, an adjacent laser beam is applied so as to overlap there appropriately. Thus, in this embodiment, each one of the weld pools formed by the pulsed laser beam is deep, the frequency of the pulse is fast, and adjacent laser pulses of the pulsed laser beam overlap at a high rate. Therefore, this embodiment enables the weld penetration depth of the welded part to be appropriately deep, so the welding quality improves remarkably and the pressure resistance increases.

In this case, in the welding step, the peak output power of the laser beam may be changed partially while scanning the laser beam along the peripheral edge portion 41*b*3 of the sealing plate 41*b*. For example, when the internal pressure of the battery case 41 rises, the force that acts on the welded portion formed at the peripheral edge portion 41*b*3 of the sealing plate 41*b* may vary partially. When the laser beam is scanned along the peripheral edge portion 41*b*3 of the sealing plate 41*b*, the way in which heat is trapped may vary partially. For this reason, it is desirable that the peak output power of the laser beam be partially adjusted appropriately from the viewpoint of obtaining an appropriate weld penetration depth of the welded part and a pressure resistance that is required when the internal pressure rises inside the battery case 41.

For example, in the embodiment shown in FIG. 2, the open end 41*a*1 of the case main body 41*a* is a substantially rectangular opening with its corners being in a circular arc shape, and the sealing plate 41*b* is also a substantially rectangular plate member with its corners being in a circular arc shape corresponding to the open end 41*a*1 of the case main body 41*a*. In the attaching step, the sealing plate 41*b* is retained on the open end 41*a*1 of the case main body 41*a* with it being in an attached condition. In this case, for example, the inner surface on the shorter sides of the open end 41*a*1 of the case main body 41*a* may be provided with a step that supports the attached sealing plate 41*b*. The step that supports the sealing plate 41*b* may be provided in a portion(s) of the inner surface of the open end 41*a*1 of the case main body 41*a*. For example, the step that supports sealing plate 41*b* may be provided at corner portions of the rectangular-shaped open end 41*a*1. The step that supports the sealing plate 41*b* may be provided on the inner surfaces of the shorter sides of the rectangular-shaped open end 41*a*1. It is also possible that, with the sealing plate 41*b* being attached to the open end 41*a*1 of the case main body 41*a*, the side walls on the pair of longer sides of the open end 41*a*1 of the case main body 41*a* may be sandwiched by a jig so that the sealing plate 41*b* is retained on the open end 41*a*1 of the case main body 41*a*. It should be noted that although the open end 41*a*1 of the case main body 41*a* and the sealing plate 41*b* are illustrated as being in a substantially rectangular shape herein, the open end 41*a*1 of the case main body 41*a* and the sealing plate 41*b* are not limited to being in a rectangular shape unless specifically stated otherwise. The open end 41*a*1 of the case main body 41*a* and the sealing plate 41*b* may be in a circular shape or an oval shape, for example.

Figure 4:
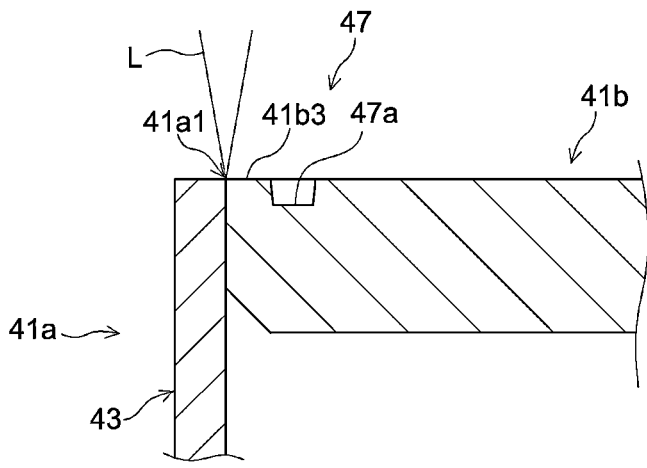
FIG. 4 is a cross-sectional view taken along line A-A in FIG. 2.
Figure 5:
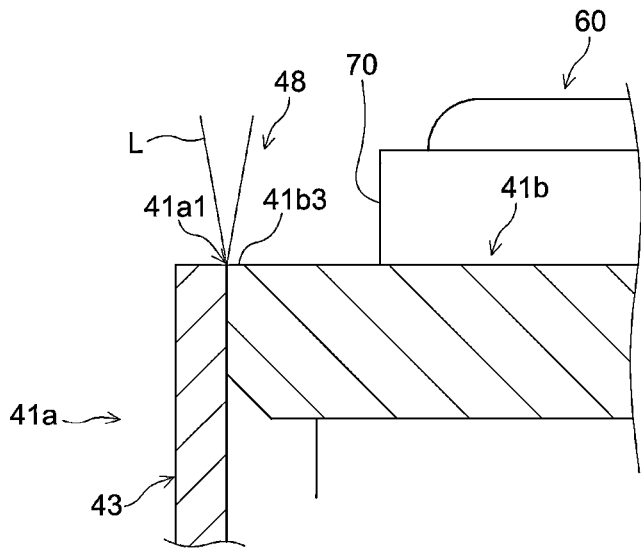
FIG. 5 is a cross-sectional view taken along line B-B in FIG. 2.

In this embodiment, the peripheral edge portion 41*b*3 of the sealing plate 41*b* before being welded includes a grooved portion 47 in which a groove 47*a* is formed inward of the peripheral edge portion 41*b*3, and an ungrooved portion 48 in which the groove 47*a* is not formed inward of the peripheral edge portion 41*b*3. The ungrooved portion 48 is disposed at a location of the peripheral edge portion 41*b*3 of the sealing plate 41*b* that is close to the location where the gasket 70 is disposed. In this embodiment, the groove 47*a* is formed inward of the peripheral edge portion 41*b*3 except for the location where the gasket 70 is disposed. FIG. 4 is a cross-sectional view taken along line A-A in FIG. 2. FIG. 4 shows a cross section of the grooved portion 47. FIG. 5 is a cross-sectional view taken along line B-B in FIG. 2. FIG. 5 shows a cross section of the ungrooved portion 48. FIGS. 4 and 5 schematically illustrate a laser beam L that is applied to the edge of the open end 41*a*1 of the case main body 41*a* and to the peripheral edge portion 41*b*3 of the sealing plate 41*b*. When the groove 47*a* is provided, a melt along peripheral edge portion 41*b*3 of the sealing plate 41*b* the tends to form easily on the outer edge side of the groove 47*a*, so the formation of the weld pool can be easily controlled. On the other hand, in the location where the gasket 70 is disposed, the gasket 70 may be melted by the laser beam L that is reflected by the groove 47*a* when the groove 47*a* is provided. For this reason, in this embodiment, the groove 47*a* is not formed in a location that is close to the location where the gasket 70 is disposed.

In this case, the ungrooved portion 48 tends to cause heat to escape from the peripheral edge portion 41*b*3 of the sealing plate 41*b* more easily than the grooved portion 47. For this reason, in the case where the peripheral edge portion 41*b*3 of the sealing plate 41*b* includes the grooved portion 47 and the ungrooved portion 48, the peak output power of the laser beam L when welding the ungrooved portion 48 may be set higher than the peak output power of the laser beam L when welding the grooved portion 47 in the welding step. Thus, by setting the peak output power of the laser beam L when welding the ungrooved portion 48 to be higher, the difference between the weld pool formed in the grooved portion 47 and that in the ungrooved portion 48 is made smaller so that the weld pool can be formed closer to the targeted weld pool over the entire perimeter. Thus, in the case where the peripheral edge portion 41*b*3 of the sealing plate 41*b* before being welded includes the grooved portion 47 in which the groove 47*a* is formed and the ungrooved portion 48 in which the groove 47*a* is not formed inward of the peripheral edge portion 41*b*3, the peak output power of the laser beam L when welding the ungrooved portion 48 may be set higher, provided that other conditions being approximately equal. For example, as illustrated in FIG. 2, when each of the longer side portions 91 and 92 includes the grooved portion 47 and the ungrooved portion 48, the peak output power of the laser beam L when welding the ungrooved portion 48 may be set higher.

As illustrated in FIG. 2, the sealing plate 41*b* is a rectangular-shaped member, and the sealing plate 41*b* includes a pair of longer side portions 91 and 92 opposing each other and a pair of shorter side portions 93 and 94 opposing each other. The open end 41*a*1 of the case main body 41*a* has a substantially rectangular shape corresponding to the sealing plate 41*b*.

According to the knowledge of the present inventors, a very small gap may form at the shorter side portions 93 and 94 when the sealing plate 41*b* is attached and retained onto the open end 41*a*1 of the case main body 41*a*. When such a gap is present, the laser beam may partially leak from the gap, and the weld penetration of the welded portion is likely to be shallower. On the other hand, when the internal pressure rises inside the battery case 41, the wider surface portions 43 and 44 tend to deform more significantly than the narrower surface portions 45 and 46. Accordingly, the welded portion of the peripheral edge portion 41*b*3 of the sealing plate 41*b* is likely to have a greater stress in the longer side portions 91 and 92 than in the shorter side portions 93 and 94.

In this embodiment, in the welding step, the peak output power of the laser beam when welding the longer side portions 91 and 92 is set higher than the peak output power of the laser beam when welding the shorter side portions 93 and 94. Thus, it is possible to obtain an appropriate proof stress according to the difference between the stress acting on the welded portion of the longer side portions 91 and 92 and that acting on the shorter side portions 93 and 94 even when the internal pressure rises in the battery case 41. This ensures that the welded portion has a required joining strength over the entire perimeter of the sealing plate 41*b*. Moreover, the weld penetration of the welded portion does not become deeper than is necessary in the shorter side portions 93 and 94, so the output power of the laser beam can be reduced. As a result, the power consumption as a whole in the welding step can be kept low.

In addition, in this embodiment, the sealing plate 41*b* includes curved portions 95 to 98 disposed between the longer side portions 91 and 92 and the shorter side portions 93 and 94, as illustrated in FIG. 2. In this embodiment, in the welding step, the peak output power of the laser beam when welding the curved portions 95 to 98 is set lower than the peak output power of the laser beam when welding the shorter side portions 93 and 94. This is because stress is less likely to act on the welded portion in the curved portions 95 to 98 even when the internal pressure rises in the battery case 41. This allows the weld penetration of the welded portion not to become deeper than is necessary in the curved portions 95 to 98, so the output power of the laser beam can be reduced. As a result, the power consumption as a whole in the welding step can be kept low.

In addition, in the welding step, the laser beam is scanned along the peripheral edge portion 41*b*3 of the sealing plate 41*b*. In this embodiment, the peak output power of the laser beam is changed respectively for the grooved portion 47 and the ungrooved portion 48 of the longer side portions 91 and 92, the shorter side portions 93 and 94, and the curved portions 95 to 98, as described above. At that time, the peak output power of the laser beam is gradually increased at the respective boundary portions. In this embodiment, each one of the weld pools formed by the pulsed laser beam is deep and the frequency of the pulse is fast; therefore, adjacent laser pulses of the pulsed laser beam overlap at a high rate. Then, before the weld pool formed by a previously emitted laser beam solidifies completely, an adjacent laser beam is emitted so as to overlap there appropriately. Therefore, in the case where the peak output power of the laser beam is changed, the peak output power of the laser beam is gradually increased at the boundary portion, so that the weld penetration depth of the welded portion can be changed continuously and smoothly. As a result, the welding quality is improved remarkably, and the pressure resistance is increased.

Furthermore, in this embodiment, a portion at which welding is started and a portion at which welding is ended overlap in the peripheral edge portion 41*b*3 of the sealing plate 41*b*. In the portion at which welding is started, the temperature of the sealing plate 41*b* or the open end 41*a*1 of the case main body 41*a* tends to be lower, and the weld penetration of the welded portion also tends to be shallower. Because the portion at which welding is started and the portion at which welding is ended overlap, the weld penetration becomes deeper in the area at which welding is started.

Herein, the peak output power of the laser beam may be determined in advance according to the material used for the case main body 41*a* and the sealing plate 41*b* so that an appropriate molten depth can be obtained. However, according to the knowledge of the present inventors, the weld penetration depth of the welded location does not become stable when the peak output power of the laser beam is made constant. In particular, in the case where the pulse width is from 400 µm to 800 µm, the frequency is high, from 1.2 kHz to 1.4 kHz, and the laser beam is scanned at a constant rate, it is desirable that the laser beam peak power is adjusted appropriately from the viewpoint of stabilizing the weld penetration depth of the welded part. When the peak output power of the laser beam is too high, spatter is likely to form, whereas when the peak output power is too low, the weld penetration depth becomes too shallow. From such a viewpoint, the peak output power of the laser beam may be set within the range of 3.0 kW to 5.0 kW and set to a level such that spatter is unlikely to form and the weld penetration depth does not become too shallow.

When the peak output power of the laser beam is within the range of 3.5 kW to 5.0 kW, it is possible to form a welded portion with an appropriate weld penetration depth in the case where an aluminum plate is used for the case main body 41*a* or the sealing plate 41*b*, for example. Moreover, the peak output power of the laser beam may be changed partially while scanning the laser beam according to the shape of the sealing plate 41*b* and the open end 41*a*1 of the case main body 41*a* and whether or not the sealing plate 41*b* includes a groove, for example. For example, when an A3003 aluminum plate is used for the case main body 41*a* and an A1050 aluminum plate is used for the sealing plate 41*b*, the peak output power of the laser beam may be adjusted within the range of, for example, 3380 W to 3950 W, the range in which spatter is less likely to form and the weld penetration depth does not become too shallow. Thus, the peak output power of the laser beam may be determined appropriately according to the materials used for the case main body 41*a* and the sealing plate 41*b*.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

What is claimed is:

1. A method of manufacturing a secondary battery, comprising:

an attaching step of attaching a sealing plate to an open end of a closed-bottom case main body, the open end disposed opposite a bottom surface; and a welding step of laser-welding together the case main body and the sealing plate by scanning a laser beam along a peripheral edge portion of the sealing plate, wherein:

in the welding step, the laser beam applied to the peripheral edge portion of the sealing plate and an edge of the open end of the case main body is a pulsed laser beam including a rectangular wave and having a pulse width of from 400 μm to 800 μm and a frequency of from 1.2 kHz to 1.4 kHz; and the laser beam is scanned so that adjacent laser pulses of the pulsed laser beam overlap at an overlap rate of from 84.4% to 86.6%, wherein:

the peripheral edge portion of the sealing plate before being welded includes a grooved portion in which a groove is formed inward of the peripheral edge portion, and an ungrooved portion in which the groove is not formed; and in the welding step, a peak output power of the laser beam when welding the ungrooved portion is set higher than a peak output power of the laser beam when welding the grooved portion.

2. The method according to claim 1, wherein, in the step of welding, a peak output power of the laser beam is changed partially while scanning the laser beam along the peripheral edge portion of the sealing plate.

3. The method according to claim 1, wherein:

the sealing plate is a rectangular-shaped plate member including a pair of longer side portions opposing each other and a pair of shorter side portions opposing each other;

the open end of the case main body has a substantially rectangular shape corresponding to the sealing plate; and in the welding step, a peak output power of the laser beam when welding the longer side portions is set higher than a peak output power of the laser beam when welding the shorter side portions.

4. The method according to claim 3, wherein:

the sealing plate includes curved portions disposed between the longer side portions and the shorter side portions; and in the welding step, a peak output power of the laser beam when welding the curved portions is set lower than a peak output power of the laser beam when welding the shorter side portions.

5. The method according to claim 4, wherein the peak output power of the laser beam is gradually increased at respective boundaries between the curved portions and the longer side portions and the shorter side portions in the peripheral edge portion of the sealing plate.

6. The method according to claim 1, wherein a portion at which welding is started and a portion at which welding is ended overlap in the peripheral edge portion of the sealing plate.

* * * * *